US009770844B2

(12) United States Patent
Moser et al.

(10) Patent No.: US 9,770,844 B2
(45) Date of Patent: Sep. 26, 2017

(54) FIBRE REINFORCED COMPOSITES

(71) Applicants: Hexcel Composites Limited, Cambridge (GB); Hexcel Holding GMBH, Pasching (AT)

(72) Inventors: Johannes Moser, Pasching (AT); Philip Hadley, Cambridgeshire (GB)

(73) Assignees: Hexcel Composites Limited, Duxford (GB); Hexcel Holding GMBH, Pasching (AT)

( * ) Notice: Subject to any disclaimer, the term of this patent is extended or adjusted under 35 U.S.C. 154(b) by 186 days.

(21) Appl. No.: 14/433,903

(22) PCT Filed: Sep. 17, 2013

(86) PCT No.: PCT/EP2013/069309
§ 371 (c)(1),
(2) Date: Apr. 7, 2015

(87) PCT Pub. No.: WO2014/044688
PCT Pub. Date: Mar. 27, 2014

(65) Prior Publication Data
US 2015/0258712 A1    Sep. 17, 2015

(30) Foreign Application Priority Data

Sep. 19, 2012  (EP) .................................. 12185113
Oct. 11, 2012  (EP) .................................. 12188249
Feb. 22, 2013  (EP) .................................. 13156484

(51) Int. Cl.
*B29B 15/10*    (2006.01)
*B32B 5/10*    (2006.01)
(Continued)

(52) U.S. Cl.
CPC ............ *B29B 15/105* (2013.01); *B29B 15/12* (2013.01); *B29C 70/083* (2013.01); *B32B 5/022* (2013.01); *B32B 5/024* (2013.01); *B32B 5/028* (2013.01); *B32B 5/10* (2013.01); *B32B 5/12* (2013.01); *B32B 5/26* (2013.01); *B32B 7/04* (2013.01); *B32B 7/12* (2013.01); *B32B 27/12* (2013.01); *C08J 5/24* (2013.01); *D04H 1/74* (2013.01);
(Continued)

(58) Field of Classification Search
CPC ...................................... B29B 15/105
USPC ........................................... 428/113
See application file for complete search history.

(56) References Cited

U.S. PATENT DOCUMENTS

2004/0219855 A1* 11/2004 Tsotsis .................... B29B 11/16
442/364

FOREIGN PATENT DOCUMENTS

DE    102005000115    3/2006
DE    102006057633    2/2008
(Continued)

OTHER PUBLICATIONS

English translation of DE 102006057633.
English translation of DE 102005000115.

*Primary Examiner* — Brent O'Hern
(74) *Attorney, Agent, or Firm* — W. Mark Bielawski; David J. Oldenkamp

(57) ABSTRACT

A molding material comprising a fibrous reinforcement layer and a curable resin matrix. The fibrous reinforcement layer comprises a non-woven fabric comprising a single layer of unidirectional tows arranged at an angle greater than 0° in (Continued)

relation to the lengthwise direction of the fabric and a support structure for maintaining the arrangement of the tows.

17 Claims, 4 Drawing Sheets

(51) Int. Cl.
| | |
|---|---|
| *D04H 1/74* | (2006.01) |
| *D04H 3/04* | (2012.01) |
| *D04H 3/115* | (2012.01) |
| *C08J 5/24* | (2006.01) |
| *B32B 5/02* | (2006.01) |
| *B32B 5/26* | (2006.01) |
| *B32B 27/12* | (2006.01) |
| *B32B 5/12* | (2006.01) |
| *B32B 7/04* | (2006.01) |
| *B32B 7/12* | (2006.01) |
| *B29C 70/08* | (2006.01) |
| *B29B 15/12* | (2006.01) |
| *B29L 31/08* | (2006.01) |
| *B29K 63/00* | (2006.01) |
| *B29K 105/08* | (2006.01) |
| *B32B 37/02* | (2006.01) |
| *B32B 37/20* | (2006.01) |
| *B32B 38/08* | (2006.01) |
| *B29C 70/44* | (2006.01) |
| *B29C 70/50* | (2006.01) |

(52) U.S. Cl.
CPC ........... *D04H 3/04* (2013.01); *D04H 3/115* (2013.01); *B29C 70/44* (2013.01); *B29C 70/504* (2013.01); *B29K 2063/00* (2013.01); *B29K 2105/0881* (2013.01); *B29K 2281/06* (2013.01); *B29L 2031/085* (2013.01); *B32B 37/02* (2013.01); *B32B 37/203* (2013.01); *B32B 38/08* (2013.01); *B32B 2260/021* (2013.01); *B32B 2260/023* (2013.01); *B32B 2260/046* (2013.01); *B32B 2305/076* (2013.01); *B32B 2305/28* (2013.01); *B32B 2307/514* (2013.01); *B32B 2307/554* (2013.01); *B32B 2307/558* (2013.01); *B32B 2307/708* (2013.01); *B32B 2307/712* (2013.01); *B32B 2307/734* (2013.01); *B32B 2603/00* (2013.01); *C08J 2363/00* (2013.01); *Y02P 70/523* (2015.11); *Y10T 156/10* (2015.01); *Y10T 428/24124* (2015.01); *Y10T 442/10* (2015.04); *Y10T 442/643* (2015.04)

(56) References Cited

FOREIGN PATENT DOCUMENTS

| | | |
|---|---|---|
| EP | 0768167 | 4/1997 |
| EP | 1693496 | 8/2006 |
| EP | 1880819 | 8/2008 |
| EP | 1128958 | 8/2011 |
| WO | 2004/078443 | 9/2004 |

* cited by examiner

FIBRE REINFORCED COMPOSITES

The present invention relates to fibre reinforced composite materials comprising fibrous reinforcement material and resin material, particularly but not exclusively to resin impregnated or preimpregnated composite materials or prepregs.

Conventionally, composite parts are manufactured by stacking layers of a fibrous reinforcement material which is preimpregnated with a curable resin material (prepreg). Subsequently, the resin material is cured by heating the stack whilst it is being compressed. This causes the resin to flow to consolidate the fibrous stack, and then to subsequently cure. This results in an integral laminar composite structure. Composite laminar structures are strong and light-weight; their use is well known and they are frequently used in industrial applications such as automotive, aerospace and marine applications. For example, these structures are widely used in wind energy applications such as wind turbine blades, and in particular the outer shells of the blades, the internal spars and the root ends of the spars. They are also used for sporting goods such as for skis, skate boards, surf boards, windsurfing boards and the like.

Typically the resin material which is used to produce composite parts is a thermosetting resin such as an epoxy resin or a polyurethane resin. However thermoplastic resins may also be used. The selection of the resin material depends on the application and use of the laminate. Also, the reinforcement material can be selected from a range of suitable fibres, commonly these comprise carbon, aramid, basalt or glass fibres.

During lay-ups of prepregs, air can become trapped between layers (inter laminar air), and also within the layers of prepreg (intra laminar air). Often intra laminar air may be present as a result of imperfect impregnation during the manufacture of the prepreg material and it can remain trapped during the lay up in the mould of multiple prepreg layers in a multilayer stack.

Once cured the interlaminar and intralaminar air forms voids in the resin matrix which surrounds the fibres. In stressed components the void content of laminates formed from prepreg moulding materials significantly affects the performance, as each void is a potential point of defect which decreases the mechanical properties. Voids can affect the longitudinal and transverse flexural strength and modulus, the interlaminar shear strength, compressive strength and modulus, longitudinal and transverse tensile strength and modulus as well as fatigue resistance. Also, voids can reduce the high temperature durability and the water absorption of a composite. A low void content maximises mechanical strengths and ensures strength consistency.

EP1128958 discloses a multi layered moulding material in which largely unimpregnated fibrous layers are conjoined to a central resin layer. The unimpregnated fibrous layers promote the removal of entrapped air where a first fibrous layer is joined to a second fibrous layer with a connecting resin layer. The fibrous layers are defined as preferably unidirectional fabrics. These unidirectional fabrics are conventionally woven fabrics which comprise fibre tows which extend in the lengthwise (or warp) direction of the fabric and the tows are held in place by a weave of a fibre which is present in the weft direction (perpendicular to the lengthwise direction).

Woven fabrics generally contain both warp tows in the lengthwise direction of the fabric and weft fibre tows in the transverse direction of the fabric. The tows consist of multiple fibre elements called filaments which together form the tow. The warp tows and weft tows may contain the same material and be of the same weight, or they may contain different materials and/or weights. The warp and weft tows may be arranged at an angle relative to one another which may range from +/−10° to +/−90°.

Some woven fabrics such as weft unidirectional fabrics contain a relatively low number of warp tows. This provides the fabric with sufficient stability to allow the weft tows to be skewed in relation to the lengthwise direction. This is achieved by applying tension to one side of the fabric whilst retaining the fabric at the opposite side. This is, for example, disclosed in EP1880819. Typically fabrics of this nature possess 70-90% weft fibres and 30-10% stabilising warp fibres. Skewed fabrics have the disadvantage that the presence of the weft fibre tows introduces crimps into the warp fibre tows. In turn, this affects the mechanical performance of composite parts which are produced from these materials. Furthermore, the woven fibres cause small deviations on the otherwise flat surface of the fabric. These deviations act as sites for trapping air when resin is applied to form a prepreg. The trapped air then become voids in the final laminate further reducing mechanical properties.

Fibre reinforced composite materials are generally anisotropic and therefore they typically exhibit anisotropic mechanical properties. The optimum loading direction in a composite material is parallel to its fibre direction. Therefore in components that experience complex multidirectional loads it is commonplace to form a lay up with multiple fibre directions to form a quasi-isotropic laminate. This is often achieved by using woven fabrics with different fibre directions, or by depositing the fabrics in the mould in different orientations. However woven fabrics have the aforesaid described disadvantage of crimp.

Non-woven fabrics range from fabrics which contain fibre elements in random directions such as chopped strand fabrics, to fabrics which contain tows in a regular, substantially parallel direction. Within this application we shall refer to the latter fabrics as "oriented reinforcement fabrics". In oriented reinforcement fabrics it is commonplace to refer to the lengthwise direction of the fabric as the weft, and to the direction perpendicular thereto as the warp—even though these fabrics are not in a woven form ("non-woven").

An important advantage of oriented reinforcement fabrics as opposed to the aforesaid woven fabrics is that the fibre tows are not affected by crimp and the resulting composite structure therefore has improved mechanical performance.

However oriented reinforcement fabrics require multiple layers of oriented unidirectional fibres in order to support the orientation of the fibres and they also require cross stitching of the fabric across the multiple fabric layers in order to stabilize the fabrics during production, handling and impregnation. As a result, the fabrication process of these fabrics is complicated and inefficient.

Examples of such multiple layer oriented fabrics are disclosed in EP 0 768 167, DE 10 2005 000 115, EP 1 693 496 and DE 10 2006 057 633. In each of these documents, unidirectional continuous fibre tows are displaced at an angle in relation to the lengthwise direction of the fabric and they are co-wound to form a multiaxial fabric whereby the fibre tows of one layer support the other layer. The winding process is very complex at it requires heavy rolls of unidirectional fibre tows to be moved in a rotational motion. This limits the speed of production of multiaxial fabric (inefficient) and therefore these materials are expensive to produce. In particular, heavy weight multiaxial fabrics cannot be produced in this way.

In addition, up to now, it has not been feasible to produce preimpregnated moulding material comprising oriented fabric layers wherein each of the layers has a high fibre weight of greater than 200 g/m² (gsm). Cross stitching of heavy tows in order to stabilize these materials is difficult. In addition, upon impregnation of the fabrics to form a prepreg moulding material, these materials have a large intralaminar void content as it is difficult to adequately impregnate the heavy fabric structures.

The present invention aims to overcome the above described problems and/or to provide improvements generally.

According to the present invention, there is provided a moulding material and a process as defined in any one of the accompanying claims.

In an embodiment there is provided a single layer fabric of non-woven unidirectional tows arranged at an angle greater than 0° in relation to the lengthwise direction of the fabric and a support structure for maintaining the arrangement of the tows.

The tows are preferably discontinuous. This means that the tows are not a continuous length through the fabric.

In a preferred embodiment the tows have a length which corresponds to: width fabric/cos (warp angle). The warp angle is the angle of the tow in relation to the warp.

The tows may extend from one side of the fabric to the other side of the fabric. The tows are preferably held in place by a support structure in the form of warp stitching. The ratio of the weight of fibre tows in relation to the weight of the warp stitch may be in the range of from 1200:10 to 1200:1, or 1200:8 to 1200:5, or from 800:10 to 800:1, or 800:8 to 800:5, or from 600:10 to 600:1, or 600:8 to 600:5 or from 500:10 to 500:1, 500:8 to 500:5 or from 400:10 to 400:1, or 400:8 to 400:5 or from 300:10 to 300:1, or 300:8 to 300:5 and/or combinations of the aforesaid ranges.

In an embodiment, there is provided a fabric comprising non-woven fiber tows in a single layer, the tows held in place by a support structure. The fabric has a lengthwise or warp or 0° direction and a perpendicular, transverse or weft or 90° direction. The support structure may be in the form of a support yarn which extends in the warp or 0° direction. The tows may be arranged at an angle ranging from 2° to 90°, preferably from 20° to 60° in relation to the warp or 0° direction.

The tows are arranged at this angle as opposed to being orientated or skewed in relation to the warp. Also, the warp is not present in the form of a weave to prevent or reduce the effect of crimp in the fiber tows.

In a further embodiment of the invention, there is provided a moulding material comprising a fabric comprising non-woven fiber tows in a single layer, the tows held in place by a support structure and a curable resin matrix.

In another embodiment of the invention, there is provided a moulding material comprising a fibrous reinforcement layer and a curable resin matrix, wherein the fibrous reinforcement layer comprises a non-woven fabric, the fabric comprising unidirectional fibrous tows arranged at an angle greater than 0° in relation to the lengthwise direction of the fabric and a support structure for maintaining the arrangement of the tows.

In another embodiment the curable resin matrix is located between two fibrous reinforcement layers and the curable resin matrix partially impregnates the layers of fibrous reinforcement.

In a further embodiment, the fibrous reinforcement layers may be held in place on the resin matrix by the tack of the resin matrix. One or more fibrous reinforcement layers may be dry to the touch. The curable resin matrix may also partially impregnate the layers of fibrous reinforcement.

In a further embodiment the two layers of fibrous reinforcement fabrics comprise unidirectional fibres which are arranged at opposite angles in relation to the lengthwise direction of the fabric.

In another embodiment, the resin matrix may form the support structure.

In yet another embodiment, the fibrous reinforcement may be located onto the resin matrix. The resin matrix may hold the fibrous reinforcement in place by its inherent tack. The resin matrix may partially impregnate the fibrous reinforcement.

The support structure supports the arrangement of the unidirectional tows so that their orientation is maintained. The support structure may be provided in different forms: as additional fabric layers, as a binder, as a yarn in the form of stitching, or as loops of fibres or lashings to bind the tows, or as the resin matrix in cured, partially cured or uncured form and/or a combination of the aforesaid forms. The support structure is applied so that it does not significantly disrupt the arrangement of the fibre tows, and does not comprise any fibres which are woven in the fabric and so does not introduce any crimps into the fabric. This enables the surface of the fabric to be formed with a smoother surface profile, reducing air trapped against or inside the fabric (intra laminar air) when resin is applied.

The support structure may be applied to the fibrous reinforcement to provide venting pathways to reduce the formation of voids in addition to providing the required support for the fabric.

In an embodiment the support structure may comprise support structure fibres which are applied in the form of loops that are passed around the tows. The loops may be arranged such that the support structure fibres extend from one surface of the layer of fibrous reinforcement through to the opposing surface, thereby encircling tows to bind the tows together. The support structure fibres may pass between adjacent tows, in doing so they can also introduce spacing between tows. This arrangement provides air venting pathways in the inter and intra laminar directions as well as providing support for the fabric. The spacing also facilitates complete wetting out during the curing phase, which is especially important for applications requiring the use of heavy fabrics or a high fibre density.

The loop density of support structure fibres can be adjusted which allows the fabric to benefit from adjustable drape, stability and venting. The support structure fibres may optionally be partially or fully removed from the fibrous reinforcement after assembly of the moulding material. The support structure fibres may optionally comprise thermoplastic fibres. These may have a melting point below that of the cure temperature.

In another embodiment, the support structure fibres may be in the form of stitching or meshing or lashing or hitching. A stitching yarn or fibre may form the stitching. The stitching may pierce the tows or the stitching may be provided without piercing the tows so as to form a loop, lashing, or hitch around the tows as described above. In another embodiment the stitching can comprise a dissolvable polymer. In an embodiment the stitching can melt or dissolve during cure of the moulding material.

The support structure fibres preferably comprise continuous fibres applied to the fabric in a repeating stitch pattern, but may also comprise discontinuous fibres. The support structure fibres preferably bind the tows of the fabric with repeating loops applied in a linear pattern, which can be applied in any direction but preferably in the 0° direction. Additional support structure fibres may be applied to an opposing surface of the fabric such that they pass through loops made by fibres originating from the first surface of the fabric.

The support structure may comprise a yarn, the support structure yarn having a weight in the range of from 10 to 150 tex, preferably from 15 to 50 tex, more preferably from 20 to 120 tex, preferably from 35 to 110 tex, more preferably from 30 to 90 tex preferably from 65 to 118 tex, more preferably from 30 to 70 tex, preferably from 50 to 110 tex, more preferably from 50 to 90 tex, and preferably from 45 to 85 tex, more preferably from 45 to 52 tex, and/or combinations of the aforesaid ranges.

The support structure may comprise PES (polyethersulfone) and/or PA (polyamide).

The support structure fibres may be applied to the fabric in the form of a range of stitching patterns known to the art. In a preferred embodiment, the stitching is applied in the form of a tricot stitch. Stitching may be applied with or without piercing the fibre tows. Other stitching may comprise a pillar stitch or chain stitch. The stitches may have a spacing of 1-50 mm, preferably 1 to 30 mm, and more preferably of 5 to 20 mm. The stitching is preferably applied in lines with a spacing of 10-200 mm, preferably from 10 to 100 mm, even more preferably from 30 to 70 mm. The stitching may be applied in stitch lines in any direction, but preferably they are applied in the 0° direction in relation to the lengthwise direction of the fabric.

The unidirectional alignment of fibrous reinforcement is aligned at an angle substantially greater than 0° to the lengthwise direction. Typically the support structure is applied to the fibrous reinforcement parallel to the lengthwise direction, it can however be applied at any angle relative to the lengthwise direction. A non-parallel arrangement of support structure and fibre direction offers greater stability to the fibrous reinforcement. However, it must be noted that the fibre direction can be parallel to the lengthwise direction and the support structure applied non-parallel to this. Alternatively the support structure can be applied parallel to the fibre direction, but this may reduce support for the fibrous reinforcement. In an embodiment where the support structure comprises support structure fibres the fibres are preferably applied in linear patterns that are not parallel to the fibrous tows.

The support structure may comprise a resin, wherein a resin provides support for the fibrous reinforcement. The use of resin as a support structure may eliminate or reduce the quantity of support structure fibres required for stability of the fabric.

A resinous support structure may be applied to a fabric in a resin layer that may be continuous. The resin support structure may be applied to one or both surfaces of a layer of fibrous reinforcement.

The support structure may comprise resin applied in discrete elements, preferably comprising cured or partly cured resin. The discrete elements of resin may be applied in patterns in the form of strips, globules or random line patterns for example. Such elements can be applied on one or both surfaces of a layer of fibrous reinforcement. Both uncured and cured resins can be used to provide sufficient stability to a layer of fibrous reinforcement for handling. Spaces between the resin elements can act as channels providing venting pathways for the removal of air during lay-up. The resin support structure also provides spacing between adjacent fibrous layers for improved venting. The resin support structure may comprise a curable resin, a resinous support layer of this nature can be applied to a layer of fibrous reinforcement and immediately cured or it can be left uncured until it is cured as part of a lay-up. The resin support structure may comprise a thermoplastic that is melted, applied to the layer of fibrous reinforcement and frozen.

In an embodiment where the support structure comprises only resin, the resin is preferably applied to the fabric immediately after the fibre tows are arranged in the required uniform direction. This is to provide stability before the material is handled or incorporated into a moulding material.

The resin support structure may comprise resin on the exterior of the fibre tows of the fibrous layer, which supports adjacent tows. This may then be applied to a backing layer for further support.

The support structure may also comprise a scrim, arranged on either or both surfaces of the layer of fibrous reinforcement. The scrim may enter the interstices between tows in the fibrous reinforcement. As well as supporting the layer of fibrous reinforcement, the scrim may improve venting by providing pathways for gases to be removed during cure. The scrim may comprise a veil. The veil may comprise a light weight fabric having a weight in the range of from 3 to 30 gsm, preferably from 5 to 15 gsm.

The veil may be attached to the fibrous reinforcement. The veil may comprise a thermoplastic material and impart toughness on the laminate as well as providing support for the layer of fibrous reinforcement. The support structure may be bonded to the layer of fibrous reinforcement, by melt bonding, stitching, adhesives, or the tack from cured or uncured resin.

In an embodiment, the support structure may comprise a fibrous support layer. The fibrous support layer may be a layer onto which the layer of fibrous reinforcement is attached. The support layer may be melt bonded, stitched, adhered with an adhesive or attached with any bonding method known to the art including utilising resinous tack. The support layer confers stability to the fibrous reinforcement and improves handling characteristics. The support layer may also enhance venting of the moulding material. The fibrous support layer may be attached to the fabric by support fibres that may pass through the entire thickness of the support layer. The support layer may comprise a fibrous mat, a woven fabric or unidirectional fibres. In an embodiment where the support layer comprises a fibrous mat, preferably it comprises fibres with a weight range of from 3 to 30 gsm, preferably from 5 to 15 gsm, more preferably from 2-13 gsm. Preferably the fibres are formed from glass or carbon or a polymer but can be formed from jute, flax, basalt or any other fibres known to the art.

The fibrous reinforcement material of the present invention can be formed into a fabric by taking fibres from individual creels, cutting to length and arranging the fibres in parallel, at an angle substantially greater than 0° to the lengthwise direction. A support structure is then applied to this fibre arrangement to provide stability for handling. The non-woven fabric of the present invention may comprise unidirectional fibrous tows which are aligned entirely in a uniform direction. Fabric of this nature does not possess the crimps seen in fabric that rely on a woven thread for stability, therefore such fabrics offer a higher degree of fibre alignment and therefore improved mechanical properties.

The fabric for use in the present invention can be made using a process which comprises arranging a plurality individual tows of reinforcement fibres in a parallel arrangement, cutting tows at an angle in relation to the lengthwise direction of less than 90°; placing a cut section of tows adjacent and parallel to another cut section of tows, and applying a support structure to placed tows to maintain their parallel arrangement. An embodiment of the present invention can be made using a process wherein a layer of fibrous reinforcement comprising non-woven fabric of unidirectional fibrous tows arranged at an angle greater than 0° in relation to the lengthwise direction and a support structure is combined with a curable resinous matrix.

The moulding material of the invention comprises a non-woven fibrous reinforcement layer having fibrous tows in a single layer oriented at a selected angle (typically 30° or 45° in relation to the warp). The non-woven fibrous reinforcement has no crimp, as it is non-woven. This improves the mechanical performance of a laminate which may be formed from this material. The fibrous tows of the non-woven fibrous reinforcement layer are preferably held in place by a support structure in the form of cross-stitching. The cross-stitching promotes the release of entrapped gases during processing and curing of the moulding material. This is particularly advantageous in out of autoclave, vacuum assisted moulding processes.

In an embodiment this process further comprises providing the curable resin matrix between two fibrous reinforcement layers and partially impregnating the fibrous reinforcement layers between the curable resin matrix.

In a further embodiment the support structure comprises support structure fibres, wherein the support structure fibres are located around the reinforcement fibre tows without piercing the tows. The support structure may comprise resin, a fibrous support structure, a support fibre or various combinations of these.

The "warp", lengthwise or longitudinal direction refers to the direction perpendicular to the axis of a fabric as it is removed or rolled into a roll. Alternatively the lengthwise direction may be considered to be the machine direction, i.e. the direction parallel to the direction of manufacture (also referred to in this application as the 0° direction). In contrast, the "weft" direction is the direction which is perpendicular to the warp. Often this is also referred to as the 90° direction. Orientations of the fiber tows are indicated in relation to the warp or 0° direction.

The fibrous reinforcement may preferably be arranged at an angle of +/−5° to 90° in relation to the lengthwise direction of the reinforcement fabric, more preferable at +/−15° to 75°, again more preferably at +/−25° to 50° or most preferably, +/−30° or 45° to the lengthwise direction. In an embodiment where the invention comprises two layers of fibrous reinforcement the two fibrous layers of reinforcement will preferably be arranged at opposite angles allowing for multi directional plies to be placed in a stack.

The moulding material may be formed from a first layer of fibrous reinforcement and adjacent on its first surface is a layer of resin material. The resin material may fully or partially impregnate the fibre tows of the first layer of fibrous reinforcement. Alternatively the layer of resin material may be adhered to the layer of fibrous reinforcement due to its tacky surface and thereby minimally impregnating to outermost tows of the layer of fibrous reinforcement.

A second layer of fibrous reinforcement material may be adjacent to the opposing surface of the layer of resin material. The resin material may fully or partially impregnate the fibre tows of the second layer of fibrous reinforcement. Alternatively the layer of resin material may be adhered to the second layer of fibrous reinforcement due to its tacky surface and thereby minimally impregnating to outermost tows of the layer of fibrous reinforcement.

A second or third layer of fibrous reinforcement may be adjacent to the second surface of the first layer of fibrous reinforcement. Resin material on the surface of either of the layers of fibrous reinforcement may provide sufficient tack to adjoin the layers. Alternatively the tows of either layer of fibrous reinforcement may be partially or fully impregnated and resin in the interstices of one layer of fibrous reinforcement, may be forced into the adjacent layer on contact and therefore adjoining the two layers.

In an embodiment, resin may be applied to the first surface of a first layer of fibrous reinforcement so resin is present on both the first and second surfaces of the first layer of fibrous reinforcement. A second layer of fibrous reinforcement may be pressed onto the tacky resinous first or second surfaces of the first layer. Alternatively the resin material may partially or substantially impregnate the tows of at least one of the fibrous reinforcement layers.

In another embodiment, resin may be applied to the first surface of a first layer of fibrous reinforcement, partially impregnating the fibre tows of the layer of fibrous reinforcement, where resin material is present on a surface of the layer of fibrous reinforcement and another surface is substantially free from resin, a second layer of fibrous reinforcement being attached to the first layer of fibrous reinforcement. The second layer may be attached through surface resin tack, stitching or other bonding means.

Additional resin may be applied to one or both external surfaces of the layers of fibrous material to provide a moulding material with increased tack. The additional resin may be a different resin from the resin material which is used as a reinforcement resin in the moulding material. Increasing tack assists adjacent layers of material to be held together during processing. An additional resin layer may also enable another layer of fibrous reinforcement to be attached to the moulding material.

One or more additional fibrous layers may also be present in any of the embodiments of the present invention.

In an embodiment of the present invention, the moulding material comprises two adjacent layers of fibrous reinforcement wherein one or both layers of fibrous reinforcement are impregnated with a resinous material from their outside surfaces.

In a further embodiment, the fibrous material is impregnated with a resin material. The viscosity of the resin and the method employed for impregnation are selected to achieve the desired degree of impregnation. The degree of impregnation can be assessed using the water pickup test. In order to increase the rate of impregnation, the process may be carried out at an elevated temperature so that the viscosity of the resin is reduced. However it must not be so hot for a sufficient length of time that curing of the resin is to far accelerated. The relative amount of resin to reinforcement material, the impregnation line speed the viscosity of the resin and the density of the multifilament tows should be correlated to achieve the desired degree of impregnation between the tows and to leave spaces between the individual filaments within the tows which are unoccupied by the resin to provide air venting paths. Thus, the impregnation process is preferably carried out at temperatures in the range of from 40° C. to 110° C. more preferably 60° C. to 80° C. It is preferred that the resin content of the prepregs is such that after curing the cured moulding material contains from 30 to 40 wt %, preferably 31 to 37 wt % more preferably 32 to 35 wt % of the resin.

The resin may be spread onto the external surface of a roller and coated onto a paper or other backing material to produce a layer of curable resin. The resin composition can then be brought into contact with the multifilament tows for impregnation perhaps by the passage through rollers. The resin may be present on one or two sheets of backing material, which are brought into contact with one or both sides of the tows and consolidated such as by passing them through heated consolidation rollers to cause the desired degree of impregnation. Alternatively, the resin may be applied via a resin bath by conducting the tows through the resin (direct fibre impregnation). The resin may also comprise a solvent which is evaporated following impregnation of the fibre tows.

In a further embodiment, during impregnation the resin may be maintained in liquid form in a resin bath either being a resin that is liquid at ambient temperature or being molten if it is a resin that is solid or semi-solid at ambient temperature. The liquid resin can then be applied to a backing employing a doctor blade to produce a resin film on a release layer such as paper or polyethylene film. The fibre tows may then be placed into the resin and optionally a second resin layer may be provided on top of the fibre tows and then consolidated or the backing sheet removed and a second fibrous layer applied to the to the other surface of the resin layer.

A backing sheet may be applied either before or after impregnation of the resin. However, it is typically applied before or during impregnation as it can provide a non-stick surface upon which to apply the pressure required for causing the resin to impregnate the fibrous layer. It can be removed prior to the addition of further layers of fibrous reinforcement or resin material.

Fibre tows may be pulled through a resin, these may then be assembled into the fabric of the present invention which is incorporated into the moulding material. The invention is particularly useful in applications where a final laminate is obtained from a stack of a plurality of layers comprising fibre reinforcement material and resin material such as a stack or structure containing at least 20 such layers. The invention is directed to increasing the fibre alignment of the reinforcement material and also minimising air entrapped between the stacked layers of the moulding material.

The tows employed in the present invention are made up of a plurality of individual filaments. There may be many thousands of individual filaments in a single tow. The tow and the filaments within the tow are generally unidirectional with the individual filaments aligned substantially parallel. Typically the number of filaments in a tow can range from 2,500 to 10,000 to 50,000 or greater. Tows of about 25,000 carbon filaments are available from Toray and tows of about 50,000 carbon filaments are available from Zoltek.

The reinforcing fibres may comprise synthetic or natural fibres or any other form of material or combination of materials that may be combined with the resin composition of the invention. Exemplary fibres include glass, carbon, graphite, boron, ceramic and aramid. Preferred fibres are carbon and glass fibres. Hybrid or mixed fibre systems may also be envisaged. The weight of fibres within the fibrous reinforcement is generally 20-10000 g/m², preferably 50 to 800-2500 g/m², even more preferably from 1200 to 2400 g/m² and especially preferably from 150 to 600 g/m² and/or combinations of the aforesaid ranges The number of carbon filaments per tow can vary from 3000 to 100,000, again preferably from 6,000 to 80,000 and most preferably from 12,000 to 40,000 and/or combinations of the aforesaid ranges. For fiberglass reinforcements, fibres of 600-2400 tex are particularly adapted.

The multifilament tows used in this invention may comprise cracked (i.e. stretch-broken), selectively discontinuous or continuous filaments. The filaments may be made from a wide variety of materials, such as carbon, basalt fibre, graphite, glass, metalized polymers, aramid and mixtures thereof. Glass and carbon fibres tows are preferred; carbon fibre tows, being preferred for wind turbine shells of length above 40 meters such as from 50 to 60 meters. The structural fibres are individual tows made up of a multiplicity of unidirectional individual fibres. Typically the fibres will have a circular or almost circular cross-section with a diameter for carbon in the range of from 3 to 20 µm, preferably from 5 to 12 µm. For other fibres, including glass, the diameter may be in the range of from 3 to 600 µm, preferably from 10 to 100 µm.

Exemplary fabrics include B315-E05 manufactured to the applicant's specification by Devoid.

In a further embodiment of the invention the fibrous reinforcement layer or fabric is non-skewed. This means that no tension is applied to the reinforcement layer during its production to orientate the direction of the fibrous reinforcement (no skewing takes place).

In an embodiment, the fabric is produced by aligning fibre tows at a desired angle (of for example 30° or 45°) to the lengthwise direction, cutting the tows and applying a support structure such as stitching in the 0° direction. Aligning of the fibre tows may take place by positioning the fibre tows in the desired positions.

Another Exemplary fabric is or B310NW/G manufactured to the applicant's specification by Saertex. The fabric may comprise multiple unidirectional tow layers bonded to form a multidirectional fabric. The fabric may be provided with a support fibre having an areal weight of between 2 and 200 gsm (g/m²), or preferably 4 to 100 gsm, or more preferably 5 to 50 gsm, more preferably still, 6 to 15 gsm. The yarn may be applied with a stitch length between 0.5 to 15 mm, preferably 1 to 10 mm or more preferably 2 to 5 mm, or more preferably still, 2.5-3.8 mm. The fabric may be supplied with a width of 10 mm to 4000 mm, from 200 to 4000 mm or more preferably 1200 to 3600 mm, from 100 to 400 mm, from 120 to 240, at 120 mm or 240 mm and/or combinations of the aforesaid widths.

An example of a fabric which may be suitable for use in the invention may have substantially the following properties either alone, but preferably in combination with one or more of the following properties: an areal weight of 310 gsm (g/m²); comprising unidirectional tows of 300 gsm arranged at 30°; an stitched with a fibre such that the weight of the stitched fibre is 10 gsm; with stitching applied in the lengthwise direction; the tows of the fabric may have a linear mass density of 1200 tex and the support fibre may have a linear mass density of 34 tex. Another fabric suitable for use in the invention may have an areal weight of 310 gsm with the tows substantially arranged at 30° or 45° to the lengthwise direction, the fabric may include a support structure comprising fibres of 10 gsm or 13 gsm, for example. A further example of a suitable fabrics may be one with an areal weight of substantially 600 gsm with the tows substantially arranged at either 30° or 45° to the lengthwise direction, and a support layer of substantially 10 gsm or 13 gsm.

An example of a fabric which may be suitable for use in the invention may have substantially the following properties: an areal weight of 1181 gsm, comprising a layer of unidirectional tows of 301 gsm arranged at +45 or 30°, a layer of unidirectional tows of 301 gsm arranged at −45 or 30° and a layer of unidirection tows of 567 gsm, which are bonded with a support structure in the form of a fibre of 12 gsm. The stitching fibre may comprise polyethersulphone and be applied in a tricot stitch.

The moulding materials of this invention may be produced from conventionally available epoxy resins which may contain a hardener and optionally an accelerator. In an embodiment the epoxy resin may contain a hardener such as a dicyandiamide or a urea based or urea derived curing agent. The relative amount of the curing agent and the epoxy resin that should be used will depend upon the reactivity of the resin and the nature and quantity of the fibrous reinforcement in the moulding material.

The epoxy resin composition preferably also comprises one or more urea based curing agents and it is preferred to use from 0.5 to 10 wt % based on the weight of the epoxy resin of a curing agent, more preferably from 1 to 8 wt %, and even more preferably from 2 to 8 wt %. Preferred urea based materials are the range of materials available under the commercial name Urone® as supplied by Alzchem, such as UR500 and/or UR505. In addition to a curing agent, a suitable accelerator such as a latent amine-based curing agent, such as dicyanopolyamide (DICY) or dicyandiamide.

In an embodiment the epoxy resin preferably has an Epoxy Equivalent Weight (EEW) in the range from 150 to 1500 preferably a high reactivity such as an EEW in the range of from 200 to 500 and the resin composition comprises the resin and an accelerator or curing agent. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof. Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

In a further embodiment the resin matrix may comprise an epoxy resin containing from 20% to 85% by weight of an epoxy resin of EEW (epoxy equivalent weight) from 150 to 1500, said resin being curable by an externally applied temperature in the range of 70° C. to 110° C. The epoxy resin may contain from 0.5 to 10 wt % of a curing agent. The epoxy resin may be cured in the absence of a traditional hardener such as dicyandiamide.

In a further embodiment, the resin matrix can be cured in less than ten hours particularly less than eight hours. The curing agent may be urea based. In a further embodiment, the moulding material may comprise from 20 to 85 wt % of epoxy resin and from 80 to 15 wt % of fibres.

The epoxy equivalent weight can be calculated as follows: (Molecular weight epoxy resin)/(Number of epoxy groups per molecule). Another way is to calculate with epoxy number that can be defined as follows: Epoxy number=100/epoxy eq.weight. To calculate epoxy groups per molecule: (Epoxy number×mol.weight)/100. To calculate mol.weight: (100× epoxy groups per molecule)/epoxy number. To calculate mol.weight: epoxy eq.weight×epoxy groups per molecule. The present invention is particularly concerned with providing a prepreg that can be based on a reactive epoxy resin that can be cured at a lower temperature with an acceptable moulding cycle time.

In another embodiment, there is provided a moulding material comprising a structural fibrous layer impregnated with an epoxy resin the epoxy resin having an EEW of from 150 to 1500 and being curable at a temperature in the range of 70° C. to 110° C.

Toughening materials may be included with the resin to impart durability to the matrix. Toughening materials may be applied as a separate layer in the form of a veil, or as particles, or mixed into the resin material. If the additional toughening material is a polymer it should be insoluble in the matrix epoxy resin at room temperature and at the elevated temperatures at which the resin is cured. Depending upon the melting point of the thermoplastic polymer, it may melt or soften to varying degrees during curing of the resin at elevated temperatures and re-solidify as the cured laminate is cooled. Suitable thermoplastics should not dissolve in the resin, and include thermoplastics, such as polyamides (PAS), polyethersulfone (PES) and polyetherimide (PEI). Polyamides such as nylon 6 (PA6) and nylon 12 (PA12) and mixtures thereof are preferred.

The cured moulding material may comprise structural fibres at a level of from 45% to 75% by volume (fibre volume fraction), preferably from 55% to 70% by volume, more preferably from 58% to 65% by volume (DIN EN 2564 A). The moulding material may comprise 10%-60% of resin by weight of the moulding material, preferably from 20% to 50% by weight, more preferably 30% to 40% by weight, and most preferably 35% by weight.

A moulding material may be formed with the fibrous reinforcement material having an overall areal weight of substantially 600 gsm. The fibrous reinforcement may comprise two fabric layers with tows arranged at substantially +30° or −30° or +45° or −45° in each layer. The individual fabric layers may each have an areal weight of substantially 300 gsm. The individual fabric layers may include a support layer of 10 gsm areal weight. This fabric may be combined with a resin, an example of which may be M9.6 as supplied by Hexcel. The resin may be combined with the fibrous reinforcement to comprise 35% by weight of the moulding material, for example.

The moulding material may be provided with one or more backing sheets to facilitate handling of the material and/or rolling up of the material. The backing sheet may comprise a polyolefin based material such as polyethylene, polypropylene and/or copolymers thereof.

The backing sheet may comprise embossing. This has the advantage of providing the moulding material with an air venting surface structure. The air venting surface structure comprising embossed channels which allow air to escape during processing. This is particularly useful as this prevents interply entrapment as interply air is effectively removed via the air venting surface channels.

Once prepared the moulding material may be rolled-up, so that it can be stored for a period of time. It can then be unrolled and cut as desired and optionally laid up with other moulding materials to form a stack in a mould or in a vacuum bag which is subsequently placed in a mould and cured.

The moulding material of this invention is intended to be laid-up with other composite materials (e.g. other moulding materials which may also be according to this invention or they may be other moulding materials) to produce a curable laminate or a stack. The moulding material is typically produced as a roll and in view of the tacky nature of such materials, a backing sheet is generally provided to enable the roll to be unfurled at the point of use. Thus, the moulding material may comprise a backing sheet on an external face.

A stack of prepregs for preparing cured laminates may contain more than 40 prepreg layers, typically more than 60 layers and at times more than 80 layers, some or all of which may be prepregs according to the present invention. One or more of the prepreg layers in the stack may be cured or precured to part process the resin in the prepreg layer. It is however preferred that all the prepregs are according to the invention. Typically the stack will have a thickness of from 1 cm to 10 cm, preferably from 2 cm to 8 cm, more preferably from 3 to 6 cm.

Once prepared, the prepreg or prepreg stack is cured by exposure to an elevated temperature, and optionally elevated pressure, to produce a cured laminate. As discussed above, the prepregs of the present invention can provide excellent mechanical properties without requiring the high pressures encountered in an autoclave process.

Thus, in a further aspect, the invention relates to a process of curing the thermosetting resin within a prepreg or prepreg stack as described herein, the process involving exposing the prepreg or prepreg stack to a temperature sufficient to induce curing of the thermosetting resin composition and is preferably carried out at a pressure of less than 3.0 bar absolute. The curing process may be carried out at a pressure of less than 2.0 bar absolute, preferably less than 1 bar absolute. In a particularly preferred embodiment the pressure is less than atmospheric pressure. The curing process may be carried out at one or more temperatures in the range of from 80 to 200° C., for a time sufficient to cure the thermosetting resin composition to the desired degree.

Curing at a pressure close to atmospheric pressure can be achieved by the so-called vacuum bag technique. This involves placing the prepreg or prepreg stack in an air-tight bag and creating a vacuum on the inside of the bag. This has the effect that the prepreg stack experiences a consolidation pressure of up to atmospheric pressure, depending on the degree of vacuum applied.

Once cured, the prepreg or prepreg stack becomes a composite laminate, suitable for use in a structural application, for example an aerospace structure or a wind turbine blade. The invention has applicability in the production of a wide variety of materials. One particular use is in the production of wind turbine blades and spars. Typical wind turbine blades comprise two long shells which come together to form the outer surface of the blade and a supporting spar within the blade and which extends at least partially along the length of the blade. The shells and the spar may be produced by curing the prepregs or stacks of prepregs of the present invention.

The length and shape of the shells vary but the trend is to use longer blades (requiring longer shells) which in turn can require thicker shells and a special sequence of prepregs within the stack to be cured. This imposes special requirements on the materials from which they are prepared. Prepregs based on unidirectional multifilament carbon fibre tows are preferred for blades of length 30 meters or more particularly those of length 40 meters or more such as 45 to 65 meters. The length and shape of the shells may also lead to the use of different prepregs within the stack from which the shells are produced and may also lead to the use of different prepregs along the length of the shell. In view of their size and complexity the preferred process for the manufacture of wind energy components such as shells and spars is to provide the appropriate prepregs within a vacuum bag, which is placed in a mould and heated to the curing temperature. The bag may be evacuated before or after it is placed within the mould.

The reduction in the number of voids and improved fibre alignment in the laminates is particularly useful in providing shells and/or spars and/or spar caps for wind turbine blades having uniform mechanical properties. Particularly spars and parts thereof are subjected to high loads. Any reduction in void content or increase of fibre alignment greatly improves the mechanical performance of these parts. This in turn allows the parts to be built at a reduced weight (for example by reducing the number of prepreg layers) in comparison to a similar part which would have a higher void content. Furthermore, in order to withstand the conditions to which wind turbine structures are subjected during use it is desirable that the cured prepregs from which the shells and spars are made have a high Tg and preferably a Tg greater than 90° C.

The laminates produced from the prepregs of this invention can contain less than 3% by volume of voids, or less than 1% by volume of voids, typically less than 0.5% by volume and particularly less than 0.1% by volume based on the total volume of the laminate as measured by microscopic analysis of 20 spaced cross sections measuring 30×40 mm in cross section (spacing 5 cm) of a cured sample of the laminate. The cross section is polished and analysed under a microscope over a viewing angle of 4.5 to 3.5 mm to determine the surface area of the voids in relation to the total surface area of each cross section of the sample and these measurements are averaged for the number of cross sections. This method for determining the void fraction is used within the context of this application, although alternative, standardized methods are available such as DIN EN 2564. These methods are however expected to provide comparative results in relation to the microscopic analysis as outlined here. Also, the maximum size of the voids is assessed in each viewing angle section and this number is averaged over the 20 samples. The average surface area of the voids is taken as the value of the void content by volume. We have found that void fractions or levels as low as no more than 0.01% by volume have been achieved.

The water pick-up test determines the degree of waterproofing or impregnation of the reinforcement in the uncured moulding material of this invention. In this test, a specimen of moulding material is initially weighed and clamped between two plates in such a way that a strip 5 mm wide protrudes. This arrangement is suspended in the direction of the fibres in a water bath at room temperature (21° C.) for 5 minutes. The specimen is then removed from the plates and weighed again and the difference in weight between the dry sample and the sample as it is exposed to water provides a value for the degree of impregnation within the specimen. The smaller the amount of water picked up, the higher the degree of waterproofing or impregnation. The result of the water pick-up test ("water pick-up value") is expressed as a percentage of weight increase in relation to the dry weight of the moulding material (% difference in weight in relation to dry weight).

The preferred moulding materials of this invention contain a low level of voids between the tows. It is therefore preferred that each moulding material and the moulding material stack has a water pick-up value of less than 15% or less than 9%, more preferably less than 6%, most preferably less than 3%.

Fibre alignment can be quantified using the protocol described in Creighton et al. A Multiple Field Image Analysis Procedure for Characterisation of Fibre Alignment in Composites; Composites: Part A 32 (2001) 221-229. Firstly specimens are sectioned and ground with 1200 grit SiC paper. The ground surface is then flooded with acetone and lightly abraded with wire wool. Micrographs are then taken of the prepared surface and then analysed with an automated image analysis algorithm. The algorithm automatically detects structural features such as fibres and matrix. The algorithm creates an array of pixels which represent a fibre, inclination angle is then calculated along the array between neighbouring pixels and used to deduce extent of fibre misalignment.

The invention will now be clarified by way of example only and with reference to the following drawings in which.

Figure 1:
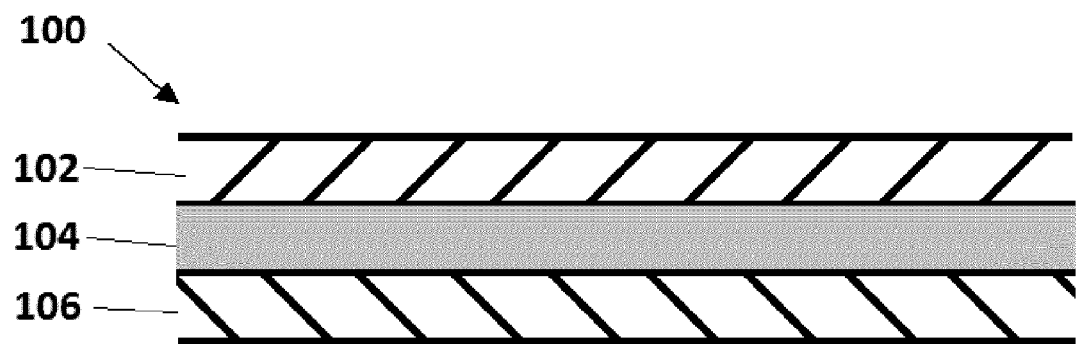
FIG. 1 is a diagrammatic view of a layer of a moulding material according to an embodiment of the invention.

FIG. 1 shows a moulding material (100) comprising a fibrous reinforcement layer (102,106) and a curable resin matrix (104), wherein the fibrous reinforcement layer comprises a non-woven fabric, the fabric comprising unidirectional fibrous tows arranged at an angle greater than 0° in relation to the lengthwise direction of the fabric and a support structure for maintaining arrangement of tows. The tows have a weight that may range from 200 to 800 g/m$^2$.

The reinforcement layers (102,106) are joined on either side of the resin layer matrix (104) and they are held in place by the tack of the resin (104). The reinforcement layers are thus largely unimpregnated with the resin matrix (104). The resin matrix (104) consists of a thermoset epoxy based resin matrix which contains both resinous components and a curative.

Figure 7:
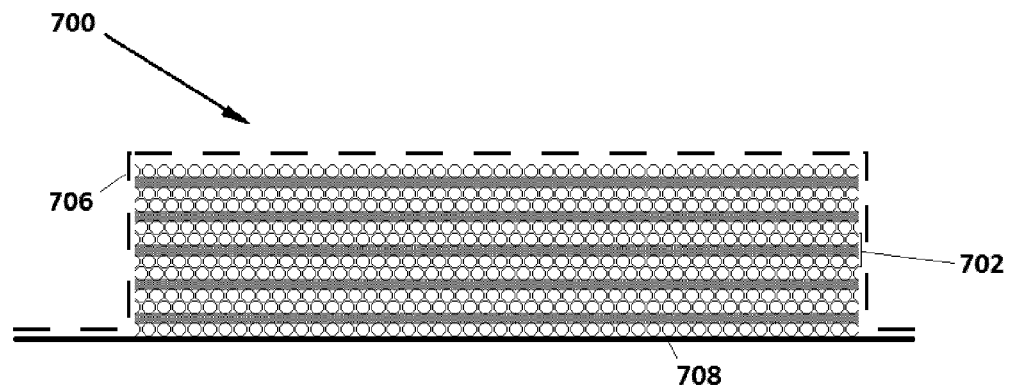
FIG. 7 is a diagrammatic view of a lay up of the moulding material according to an embodiment of the invention.

In use, the moulding material (100) may be laid up in a mould (708) by stacking one or more layers of the moulding material (100) on top of one another to form a stack (700) as is shown in FIG. 7. The formed stack (700) is covered in a vacuum bag (706) enclosure which is subsequently evacuated to remove all air. The temperature of the stack is raised, which causes the resin to flow and to impregnate the fibrous reinforcement of the individual layers. The resin subsequently cures, and after cure, the moulded stack (700) can be removed from the mould (708).

Figure 2:
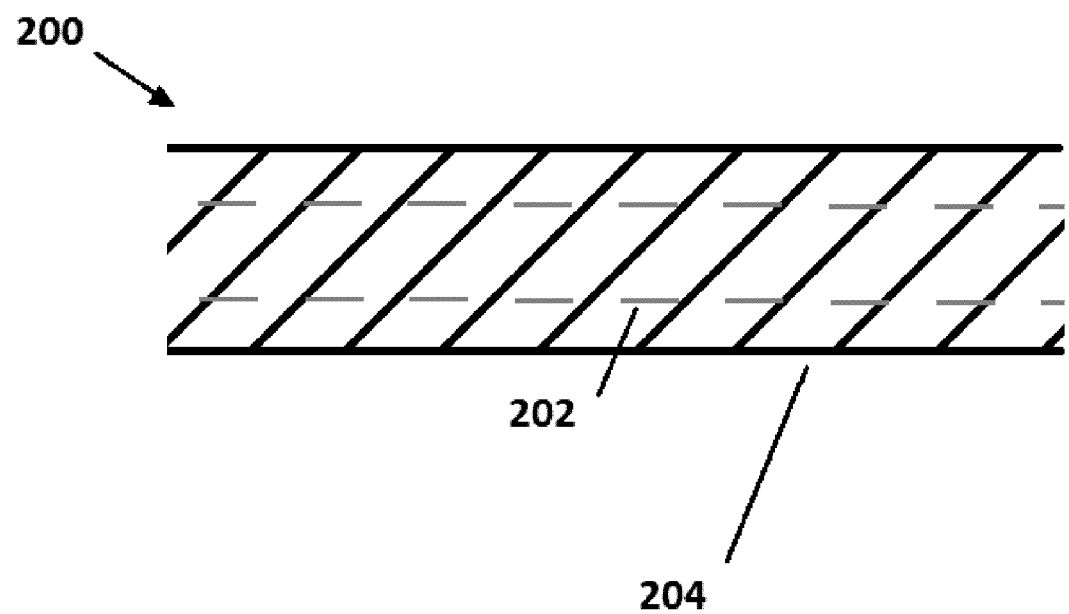
FIG. 2 is a diagrammatic view of a layer of fibrous reinforcement according to another embodiment of the invention.

An example of the fibrous reinforcement layer as used in the moulding material of FIG. 1 is presented in FIG. 2. The fibrous reinforcement layer (200) comprises fibrous tows (204) which are arranged at an angle greater than 0° in relation to the lengthwise direction of the fabric. The fibrous tows (204) are held in position in relation to one another by means of a support structure (202). The support structure (202) is in the form of a yarn which is stitched around the fiber tows (204) in such a way that the tows (204) are not pierced by the yarn. Instead, the yarn lashes or meshes with the tows (204) to keep the tows in place. As shown in FIG. 2, the yarn runs in a linear direction along the lengthwise direction of the material (200). The yarn has the benefit that it provides an additional path for air to be removed from a lay up or stack of moulding materials. In an alternative embodiment, the yarn is stitched through the fiber tows (204).

Figure 3:
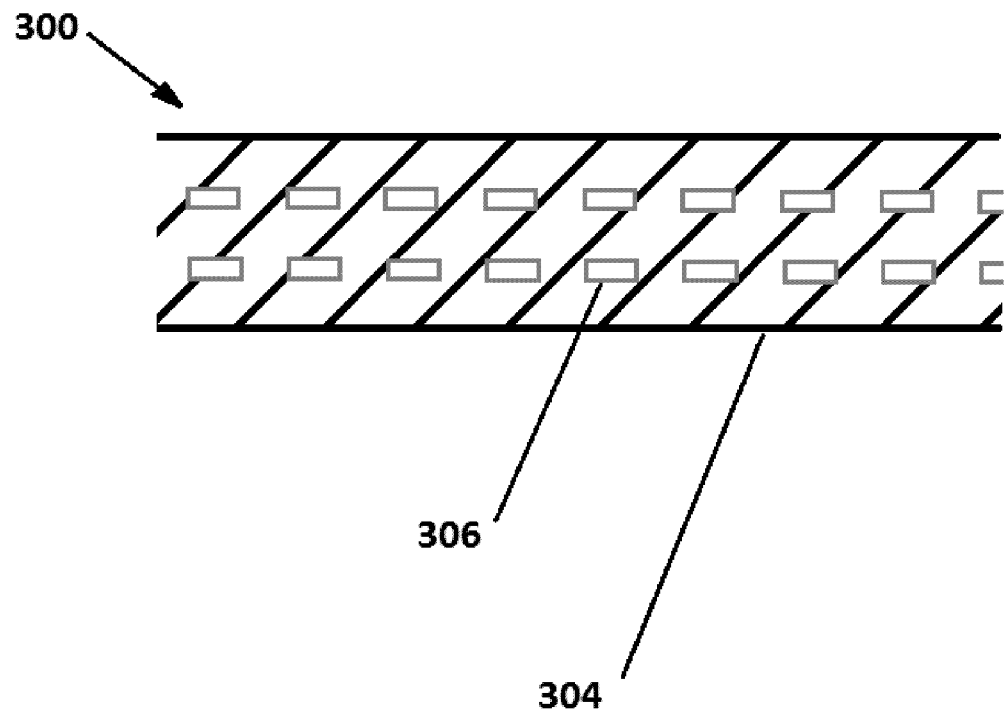
FIG. 3 is a diagrammatic view of a layer of fibrous reinforcement according to another embodiment of the invention.

As shown in FIG. 3 at 300, the tows (304) could also be held in position by means of the resin which may be applied as discrete resin elements (306), the resin may be cured or uncured and applied to both sides of the fabric.

Figure 4:
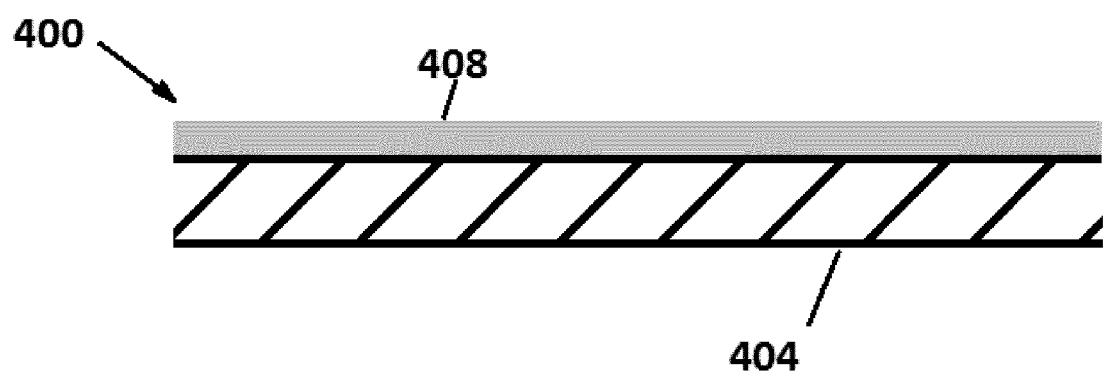
FIG. 4 is a diagrammatic view of a moulding material according to another embodiment of the invention.

In the embodiment of FIG. 4, a fibrous reinforcement layer (400) is present which comprises fibrous tows (404) arranged at an angle greater than 0° in relation to the lengthwise direction of the fabric and a support structure (408) is applied as a continuous layer to the surface of the layer of fibrous reinforcement. The support structure may comprise a scrim, a layer of fibrous material, a fibrous support layer or a thermoplastic veil. The material (400) may be applied as the fibrous reinforcement layer in the moulding material (100) of FIG. 1.

Figure 5:
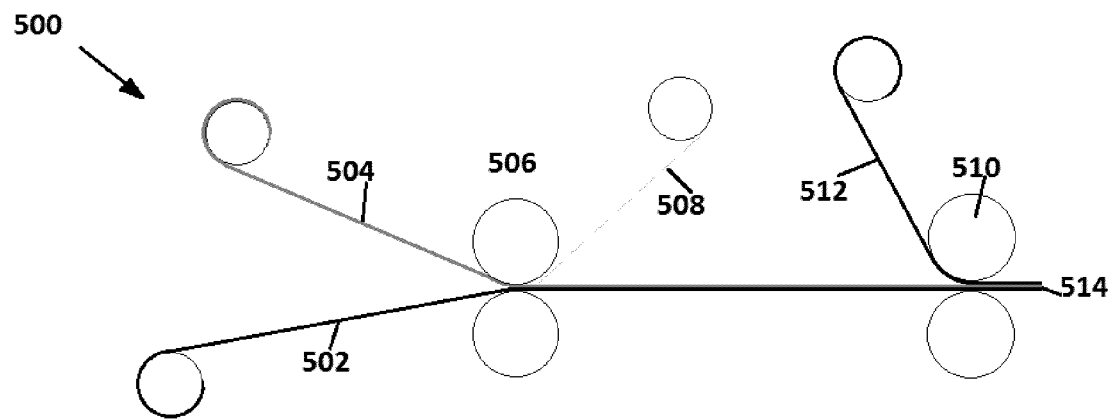
FIG. 5 is a diagrammatic view of a process for producing a moulding material according to an embodiment of the invention.

FIG. 5 shows a process (500) for producing a moulding material (514) which has the configuration of the moulding material of FIG. 1. Firstly, a layer of fibrous reinforcement (502) is supplied from a roll. The layer (502) comprises non-woven fabric formed by unidirectional tows arranged at an angle greater that 0° in relation to the lengthwise direction and a support structure in the form of a stitching yarn (not shown) which maintains the orientation of the fibers tows. This layer (502) is combined with a curable resinous matrix (504) which is provided on a paper backing sheet (not shown). The resinous matrix (504) and fiber layer (502) are passed through compression rollers (506) to tack the fiber layer (502) onto the resinous matrix (504). This results in a fiber layer which is at least partially unimpregnated by the resin. The backing layer is removed from the resin by means of a take up roller (508).

A further layer of fabric (512) in the form of a lightweight fabric veil having a weight in the range of from 1 to 100 g/m², preferably from 3 to 50 g/m², and more preferably from 5 to 15 g/m² is added to the material by a further set of compression rollers (510). The compression impact of the rollers (510) is variable to control the level of impregnation of both the veil (512) and the fiber layer (502). This results in the moulding material (514).

In an alternative embodiment, the moulding material (514) is manufactured without the addition of the further layer of fabric (512).

Figure 6:
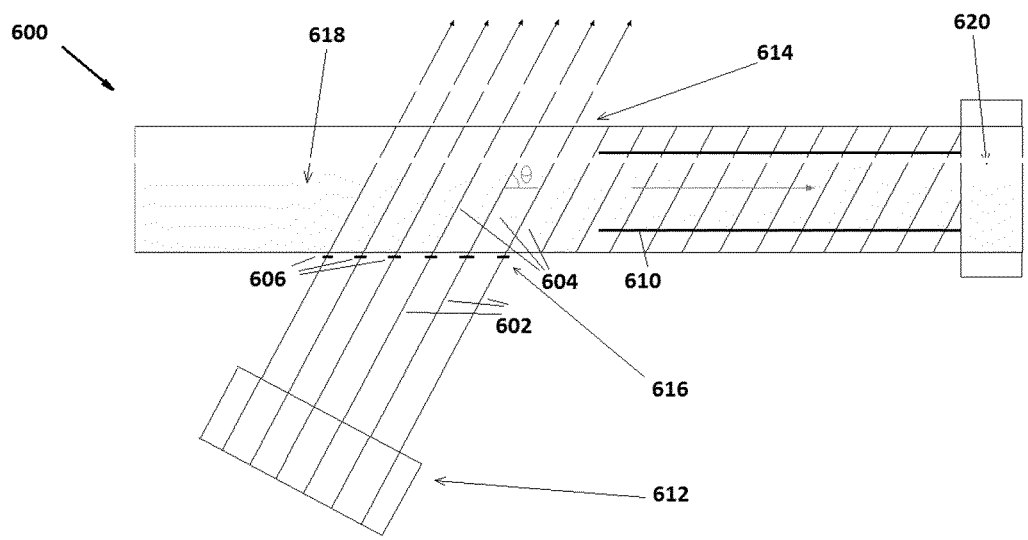
FIG. 6 is a diagrammatic view of a process of producing a fabric according to an embodiment of this invention.

FIG. 6 shows a process (600) for producing a fabric (614) for use in moulding materials such as the materials which are shown in any of FIG. 1, 3 or 4. The process (600) comprises a number of steps. A roll (612) containing a unidirectional fiber material is arranged at an angle in relation to a support surface (618) in the form of a conveyor belt. The unidirectional fiber material has parallel fiber tows (602) which extend in the lengthwise direction of the fabric (612). The fibers are held in place relative to one another by applying tension to the fibers as shown at (604). Alternatively, a light weight weft yarn which extends in a direction parallel to the lengthwise direction of the roll may be present to hold the fiber tows in place. Sections of the fabric (612) are provided on the surface (618) at an angle θ in relation to the direction of travel of the surface, and adjacent a previously cut section. As shown at (616), the fabric (612) is cut (606) parallel to the edge of the surface (618). Cut sections are continuously transported on surface (618) and a support structure (610) in the form of a stitching is applied to maintain the parallel arrangement of the tows. Finally, the fabric is rolled up onto a roll (620).

Figure 8:
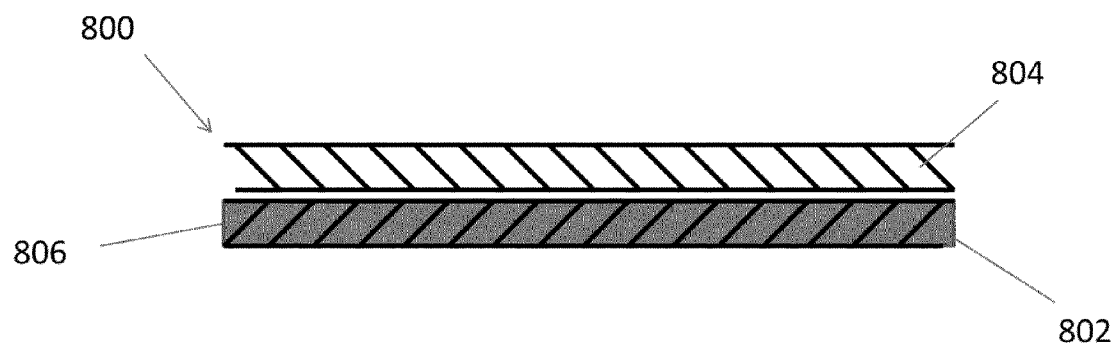
FIG. 8 is a diagrammatic view of a moulding material according to another embodiment of the invention.

FIG. 8 shows a moulding material (800) which comprises two layers of fibrous reinforcement (802, 804). One of the layers (802) is impregnated with resin (806) whilst the other layer (804) is unimpregnated.

The fibrous reinforcement layers (802,804) each have different orientations for the reinforcement fiber tows. For example the orientations may be +20 in one layer (802) and −20 in the other layer (804), or +/−30 in each of the respective layers, or +/−45 in each of the respective layers, or +/−50 in each of the respective layers whereby the orientation of the tows is defined in relation to the lengthwise (or warp) direction of the fabric layers.

The fibrous reinforcement layers (802,804) each contain tows which are held in place by support structures in the form of stitching (not shown) for each layer. The stitching consists of a stitching yarn which extends in the lengthwise or warp direction for each of the fabric layers, and the yarn pierces through the tows to retain the orientation of the tows in each of the layers. The layer (804) is held in place on layer (802) by the inherent tack of the resin (806). There is thus no need for other bonding means such as cross ply stitching to hold the individual layers in place.

In a preferred embodiment of the moulding material (800), the reinforcement fabric has a weight of 300 g/m² for the fiber tows for each layer, whilst the weight of the stitching yarn is 15 g/m². This results in a combined dry weight for the reinforcement fabric for the moulding material (800) of 630 g/m². Other reinforcement fabric weights may be selected to suit a particular application of the moulding material (800). The combined dry weight of the moulding material may range from 100 g/m² to 3000 g/m², preferably from 300 g/m² to 2400 g/m², or from 600 g/m² to 1200 g/m² and/or combinations of the aforesaid ranges.

The moulding material (800) preferably has a fiber volume fraction (FVF, % fibers in relation to the volume of the moulding material) in the range of from 40 to 50%, preferably from 42 to 49%, and more preferably from 45 to 48%, and most preferably from 45 to 46%. The FVF is determined in accordance with standard ASTM D3171 for carbon fiber composites where nitric acid is selected to remove an epoxy matrix and sulfuric acid and hydrogen peroxide are selected to remove polyimides and PEEK. If the composite is a glass fiber composite, FVF is determined using the resin burn-off method as described in standard ASTM D2584. The fiber volume fraction is calculated as FVF (%)=(Mass fibers× density composite)/(Mass composite×density fibers)×100.

As the fiber tows are not woven as in conventional reinforcement fabrics, they are not crimped and they are thus more linear. This improves the mechanical performance of laminates which are laid up using the moulding material (800). Furthermore, the dry fabric layer (804) in combination with the stitching yarn enables venting of both intralaminar and interlaminar gases during vacuum assisted processing of the moulding material (for example in a layup (700) as shown in FIG. 7, whereby the moulding materials (702) would be substituted by material (800) or perhaps used in combination with the materials (702)). The dry layer (804) and the stitching yarn enable release of gas such as air in all directions including the through thickness or z-direction of the moulding materials (800).

The invention will now be further clarified with reference to the following Examples.

EXAMPLE 1

A moulding material A was prepared of the structure as shown in FIG. 8. This material has two reinforcement fabric layers. Each of the reinforcement fabric layers contained glass fiber reinforcement tows of 1200 tex (g/km) and a stitching yarn of 34 tex. The fiber reinforcement tows were arranged at 30° for layer (802) and at −30° for layer (804) in relation to the warp or 0° or lengthwise direction of the fabric. Each of the layers contained stitching through the tows in the warp or 0° direction. The weight of the fiber tows in each of the layers was 300 g/m². The stitching density was selected so that each of the layers had a total dry weight of 315 g/m², which resulted in a combined dry weight for the moulding material of 630 g/m².

Layer (802) of moulding material A was impregnated with resin M9.6G-LT (806) as supplied by Hexcel Corporation. The dry layer (804) was located on top of the impregnated layer (802) and this layer was held in place by the tack of the resin (806), so that layer (804) was dry to touch and layer (802) was tacky due to the resin impregnation.

Moulding material B corresponded to the commercial material known as Hexfit® BB630 as supplied by Hexcel Corporation. This material consists of two layers of fibrous reinforcement material which are adhered to both sides of a central resin film of M9.6G-LT resin. The individual layers of fibrous reinforcement each consist of fiber tows of 1200 tex which are woven in the weft direction around a warp yarn of 34 tex. The weight of the fiber tows in each of the layers was 300 g/m². Warp yarn in each layer has a weight of 15 g/m², which resulted in a combined dry weight for the moulding material of 630 g/m². Each of the fibrous layers was skewed (applying tension to the fabric) to orient the fiber direction in opposite directions of +/−30 in relation to the warp. The resin tack retained the orientation of the skewed fiber tows, and the fibrous reinforcement material remained free from resin.

Four plies of each of the moulding materials A and B were laid up in stacks to compare the tensile properties of the two moulding materials. Six plies of each of the moulding materials A and B were laid up in stacks for comparing the interlaminar shear strength (ILSS) of the two moulding materials. The stacks were all cured using vacuum assisted curing in a vacuum bag at equal pressure. The cure cycle was as follows.

The temperature was ramped up at a rate of 2° C. per minute to a temperature of 80° C. The temperature was then held constant at 80° C. for 2 hours. This was then followed by a further ramp up in temperature at a rate of 2° C. per minute to a temperature of 120° C. The temperature was then held constant at 120° C. for a further 2 hours. The laminate stacks were then removed from the vacuum enclosure and allowed to cool to room temperature before mechanical testing commenced. The resin content of all stacks was determined as 35% by weight of the stacks (resin weight %). Resin weight % in relation to the cured content was determined by taking a sample of the cured laminate, and by weighing it both before and after removal of the resin by burning off the resin and calculating the resin weight %.

The fiber volume fraction FVF of each of the cured materials A and B was determined based in accordance with ASTM D2584 using resin burn off.

Tensile properties of the laminate were determined in accordance with ISO standard 527. The tensile strength a and modulus E were measured in the 0° (or warp) direction for each of the moulding materials A and B. Furthermore, the tensile strength a and modulus E were measured in the 30° and 90° directions and are listed in the below Table 1 following normalization of the measured data based on a FVF of 50% as follows:

Normalized value=measured value*$FVF_{normalized}$/$FVF_{specimen}$

Finally the interlaminar shear strength (ILSS) in the 30° direction was measured for the laminates based on standard ISO14130.

TABLE 1

Comparison +/−30 material of invention (A) and conventional +/−30 skewed material (B)

| | A | B |
|---|---|---|
| Tensile - ISO527 | | |
| FVF [%] | 47.1 | 49.9 |
| σ; 0°; [MPa] | 376 | 350 |
| E; 0°; [GPa] | 21.9 | 18.8 |
| FVF [%] | 50 | |
| σ; 30°; [MPa] | 498 | 560 |
| E; 30°; [GPa] | 27.4 | 25.4 |
| FVF [%] | 47.2 | 42.6 |
| σ; 90°; [MPa] | | |
| E; 90°; [GPa] | 9.8 | 7.7 |
| ILSS - ISO14130 | | |
| σ; 30°; [MPa] | 54 | 36 |

EXAMPLE 2

Moulding materials C and D were configured in the same way as the materials in Example 1. However the orientation of the fibers tows in each of the materials C and D was fixed at +/−45°.

In material C each of the reinforcement fabric layers contained again glass fiber reinforcement tows of 1200 tex (g/km) and a stitching yarn of 34 tex. The fiber reinforcement tows were arranged at 45° for layer (802) and at −45° for layer (804) in relation to the warp. Each of the layers contained stitching through the tows in the warp or 0° direction to retain the orientation of the tows in each layer. The weight of the fiber tows in each of the layers was 300 g/m$^2$. The stitching density was selected so that each of the layers had a total dry weight of 310 g/m$^2$, which resulted in a combined dry weight for the moulding material of 620 g/m$^2$. Layer (802) of moulding material C was impregnated with resin M9.6G-LT as supplied by Hexcel Corporation. The dry layer (804) was located on top of the impregnated layer (802) and this layer was held in place by the tack of the resin (806).

Moulding material D corresponded to the commercial material known as Hexfit® BB620 as supplied by Hexcel Corporation. This material consisted of two layers of fibrous reinforcement material which are adhered to both sides of a central resin film of M9.6G-LT resin so that the surfaces remain free from resin (dry to touch). The individual layers of fibrous reinforcement each consist of fiber tows of 1200 tex which are woven in the weft direction around a warp yarn of 34 tex. The weight of the fiber tows in each of the layers was 300 g/m$^2$. The warp yarn in each layer has a weight of 10 g/m$^2$, which resulted in a combined dry weight for the moulding material of 620 g/m$^2$. Each of the fibrous layers were skewed (applying tension to the fabric) to orient the fiber direction in opposite directions of +/−45 in relation to the warp before they were combined with the resin.

Again, four plies of each of the moulding materials C and D were laid up in stacks to measure the tensile properties of the two moulding materials. Six plies of each of the moulding materials C and D were laid up in stacks for measuring the interlaminar shear strength (ILSS) of the two moulding materials. The stacks were all cured using vacuum assisted curing in a vacuum bag at equal pressure, using the same cure cycle of Example 1. The resin content of all stacks was determined as 35% by weigh of the stacks using the same method as described in Example 1.

The fiber volume fraction FVF of each of the materials C and D was determined and mechanical testing was performed similar to Example 1, see Table 2.

Tensile properties of the laminate were determined in accordance with standard ISO 527. The tensile strength a and modulus E were measured in the 0° (or warp) direction for each of the moulding materials C and D. Furthermore, the tensile strength a and modulus E were measured in the 45° direction as listed in the below Table 2 following normalization of the measured data based on a FVF of 50% using the same calculation as in Example 1.

Finally the interlaminar shear strength (ILSS) was measured for the laminates of materials C and D based on standard ISO14130 in the 30° direction.

TABLE 2

Comparison +/−45 material of invention (C) and conventional +/−45 skewed material (D)

| | C | D |
|---|---|---|
| Tensile - ISO527 | | |
| FVF [%] | 45.4 | 45.5 |
| σ; 0°; [MPa] | 161 | 136 |
| E; 0°; [GPa] | 11.90 | 10.2 |
| FVF [%] | 50 | |
| σ; 45°; [MPa] | 492 | 377 |
| E, 45°; [GPa] | 27.44 | 26.1 |
| ILSS - ISO14130 | | |
| σ; 30°; [MPa] | 52 | 43 |

Two lay-ups of 45 plies for materials C and D having a surface area of 600×1000 mm were prepared. The lay-ups were cured in accordance with the same cure schedule as outlined in respect of Example 1.

Five cross-sectional samples were taken from the centre portion of the cured lay-up, each sample measuring 50×50× ply thickness (mm). One sample was taken from the centre and two samples were taken at distances of 300 mm and 600 mm from the centre along the 1000 mm centreline of the lay-up. The samples were analysed for FVF using the method as hereinbefore described. The samples were also analysed for void content using a microscope by measuring the surface area taken up by voids in relation to the surface area of a cross-section (50×ply thickness (mm)) of the sample across the thickness of the laminate. For each lay-up, the results for FVF and void content were averaged. It was found that for the lay-up of material C, the FVF was 51% and the void content was 2%. For the lay-up of material D, the FVF was 51% and the void content was 5%.

There is thus provided a moulding material and a fabric which is particularly suitable for producing large composite structures such as windturbine blades and in particular spars and shells for such blades.

The material of the invention provides improved fiber alignment, controlled areal weight unaffected by the manufacturing process, transport or storage, improved mechanical properties and a reduced void content in comparison to a conventional moulding material.

The invention claimed is:

1. A two layer molding material having a lengthwise direction, said two layer molding material comprising:
   a first layer of dry unidirectional fibers wherein said dry unidirectional fibers are oriented in a direction that is from −30° to −45 with respect to said lengthwise direction, said first layer of dry unidirectional fibers being held together with stitching yarns that extend in said lengthwise direction;
   a second layer of resin impregnated unidirectional fibers wherein said resin impregnated unidirectional fibers axe oriented in a direction that is from +30° to +45 with respect to said lengthwise direction, said second layer of impregnated unidirectional fibers being held together with stitching yarns that also extend in said lengthwise direction; and
   a curable resin that impregnates said second layer of resin impregnated unidirectional fibers to form a resin matrix therein.

2. A molding material according to claim 1 wherein said dry unidirectional fibers are oriented in a −30° direction with respect to said lengthwise direction and wherein said resin impregnated unidirectional fibers are oriented in a +30° direction with respect to said lengthwise direction.

3. A molding material according to claim 1 wherein said dry unidirectional fibers are oriented in a −45° direction with respect to said lengthwise direction and wherein said resin impregnated unidirectional fibers are oriented in a +45° direction with respect to said lengthwise direction.

4. A molding material according to claim 1 wherein said dry unidirectional fiber and said resin impregnated unidirectional fibers are glass fibers.

5. A molding material according to claim 2 wherein said dry unidirectional fiber and said resin impregnated unidirectional fibers are glass fibers.

6. A molding material according to claim 3 wherein said dry unidirectional fiber and said resin impregnated unidirectional fibers are glass fibers.

7. A molding material according to claim 1 wherein said curable resin comprises an epoxy resin.

8. A molding material according to claim 2 wherein said curable resin comprises an epoxy resin.

9. A molding material according to claim 3 wherein said curable resin comprises an epoxy resin.

10. A molding material according to claim 4 wherein said curable resin comprises an epoxy resin.

11. A molding material according to claim 5 wherein said curable resin comprises an epoxy resin.

12. A molding material according to claim 6 wherein said curable resin comprises an epoxy resin.

13. A molding material according to claim 1 wherein said stitching yarn comprises fibers selected from the group consisting of polyamide fibers and polyethersulfone fibers.

14. A molding material according to claim 2 wherein said stitching yarn comprises fibers selected from the group consisting of polyamide fibers and polyethersulfone fibers.

15. A molding material according to claim 3 wherein said stitching yarn comprises fibers selected from the group consisting of polyamide fibers and polyethersulfone fibers.

16. A molding material according to claim 4 wherein said stitching yarn comprises fibers selected from the group consisting of polyamide fibers and polyethersulfone fibers.

17. A molding material according to claim 7 wherein said stitching yarn comprises fibers selected from the group consisting of polyamide fibers and polyethersulfone fibers.

* * * * *